US010000149B2

(12) United States Patent
Takaguchi

(10) Patent No.: US 10,000,149 B2
(45) Date of Patent: Jun. 19, 2018

(54) CONTAINER-SECURING DEVICE

(71) Applicant: MINATO SEIKI IRON WORKS CO., LTD., Takatsuki, Osaka (JP)

(72) Inventor: Hiroyuki Takaguchi, Nagasaki (JP)

(73) Assignee: MINATO SEIKI IRON WORKS CO., LTD., Takatsuki-shi, Osaka (JP)

( * ) Notice: Subject to any disclaimer, the term of this patent is extended or adjusted under 35 U.S.C. 154(b) by 0 days. days.

(21) Appl. No.: 15/559,995

(22) PCT Filed: Apr. 9, 2015

(86) PCT No.: PCT/JP2015/061148
§ 371 (c)(1),
(2) Date: Sep. 20, 2017

(87) PCT Pub. No.: WO2016/163011
PCT Pub. Date: Oct. 13, 2016

(65) Prior Publication Data
US 2018/0065535 A1   Mar. 8, 2018

(51) Int. Cl.
*B60P 7/08* (2006.01)
*B60P 7/13* (2006.01)
*B65D 88/12* (2006.01)
*B65D 90/58* (2006.01)

(52) U.S. Cl.
CPC ............ *B60P 7/13* (2013.01); *B60P 7/132* (2013.01); *B65D 88/12* (2013.01); *B65D 90/58* (2013.01)

(58) Field of Classification Search
CPC . B60P 7/13; B60P 7/132; B65D 90/58; B65D 88/12

USPC .............. 410/69, 73, 76, 82, 83, 91; 24/287; 280/406.1
See application file for complete search history.

(56) References Cited

U.S. PATENT DOCUMENTS 4,082,052 A   4/1978 Looks
5,893,692 A   4/1999 Asanuma
(Continued)

FOREIGN PATENT DOCUMENTS

AU   1623676 A   2/1978
DE   2539741 A   3/1977
FR   2323048 A   4/1977
(Continued)

*Primary Examiner* — Stephen T Gordon
(74) *Attorney, Agent, or Firm* — Muncy, Geissler, Olds & Lowe, P.C.

(57) ABSTRACT

A container-securing device is provided. A main body of the container-securing device is detachably/attachably supported on a cargo bed yet movement of the main body is restricted in any direction within the horizontal plane. The container-securing device 1 includes a socket 3 which is fixed onto the cargo bed; and a main body 2 which is fixed into the socket 3 to fix a container: The main body 2 has its lower region formed with projections 22b extending horizontally; and the socket 3 has a storage space 31 to store the projections 22b, a first restrictor 32 around the storage space 31 which allows rotation of the projections 22b within a horizontal plane but restricts other movement thereof in any direction within the horizontal plane, an opening 33 which communicates with the storage space 31 and allows the projections 22b to be inserted through, and a second restrictor 34 around the opening 33 which restricts movement of the projections 22b in the vertical direction.

7 Claims, 8 Drawing Sheets

(56) References Cited

U.S. PATENT DOCUMENTS

| | | | | |
|---|---|---|---|---|
| 6,692,203 B2* | 2/2004 | Kim | ............... | B60P 7/132 410/69 |
| 7,484,918 B2* | 2/2009 | Brewster | ............. | B60P 7/132 410/69 |

FOREIGN PATENT DOCUMENTS

| | | | |
|---|---|---|---|
| GB | 1545902 | A | 5/1979 |
| JP | S52-39276 | A | 3/1977 |
| JP | S60-97696 | U | 7/1985 |
| JP | H10-211845 | A | 8/1998 |
| JP | 2000-191083 | A | 7/2000 |
| JP | 2007-168875 | A | 7/2007 |
| NL | 7609067 | A | 3/1977 |
| SU | 1111680 | A | 8/1984 |

* cited by examiner

CONTAINER-SECURING DEVICE

TECHNICAL FIELD

The present invention relates to container-securing devices for fixing containers onto transportation vehicles such as railroad freighters and container trailers.

BACKGROUND ART

Patent Literature 1 discloses a container-securing device including a cone which is rotatable within a horizontal plane and movable in a vertical direction. The cone is supported by a rotation table having a flat surface in such a way that while the cone is moved from a container carry-in position to a container fixing position, the cone, which is on the rotation table supported by a rotation-table receiver, is always held at an upper end position; and when the cone is moved from the container carry-in position to a cone lowering position, the cone, which is on the rotation table that is no longer supported by the rotation-table receiver, becomes lowerable.

Patent Literature 2 discloses an improved version of the container-securing device according to the Patent Literature 1, for reduced load to workers.

The container-securing devices such as these are disposed, for example, in a cargo bed of a transportation vehicle which is designed to haul a 20-foot container or a 40-foot container selectively. When the 40-foot container is to be placed on the cargo bed, the container-securing devices disposed for the 20-foot container are obstructive, so these obstructive container-securing devices are stored below the cargo bed's upper surface, following a predetermined procedure.

CITATION LIST

Patent Literature

Patent Literature 1: JP-A H 10-211845 Gazette
Patent Literature 2: JP-A 2000-191083 Gazette

SUMMARY OF INVENTION

Technical Problem

However, these conventional, storable container-securing devices have a problem that they are complicated in their construction and are costly in their manufacture, due to their needs to have a storage mechanism. On the other hand, if container-securing devices are designed to be bolted onto the cargo bed, the bolts have to be installed and removed every time the container-securing devices are installed and removed.

One idea to overcome this is, as shown in FIG. 14, a container-securing device 100 which includes a main body 101 for fixing a container, and a socket 102 for being fixed to a cargo bed of a container trailer for example. In this arrangement, the main body 101 is slidably attached to/detached from the socket 102. The socket 102 is formed with an engagement groove 102a whereas the main body 101 has its lower region formed with a projection 101a to fit into the groove. With this arrangement, each main body 101 is fitted into the engagement groove 102a which is opening inboard, for example, of the cargo bed. When a 40-foot container is to be placed on the cargo bed of the trailer and therefore the container-securing devices disposed for a 20-foot container are obstructive, the socket 102 as described above allows easy removal of the main body 101 of the obstructive container-securing device 100.

However, in this arrangement in which an opening of the engagement groove 102a allows fitting from a lateral direction, the socket 102 cannot prevent the main body 101 from moving in the direction of the opening, and it is necessary to provide a second socket 102 which has the opening in a direction different from the direction of the potential movement in order to prevent the movement. In other words, the socket 102 cannot prevent the main body 101 from moving in all directions within the horizontal plane, and therefore additional arrangements are required such as increasing strength of each individual socket 102.

In consideration of the above-described circumstances, it is an object of the present invention to provide a container-securing device in which a main body of the container-securing device is detachably/attachably supported on a cargo bed without using bolts yet movement of the main body can be restricted in all directions within the horizontal plane.

Solution to Problem

In order to achieve the object described above, the present invention provides a container-securing device which includes a socket to be fixed to a cargo bed; and a main body to be attached to the socket for fixing a container. In this arrangement, the main body has a lower region formed with a horizontally projected projection, and the socket is provided with a storage space for storing the projection; a first restrictor around the storage space which allows rotation of the projection within a horizontal plane but restricts other movement thereof in any direction within the horizontal plane; an opening which communicates with the storage space for insertion of the projection; and a second restrictor around the opening which restricts movement of the projection in a vertical direction.

According to the above-described arrangement, when the projection is placed inside the storage space through the opening and then rotated within the horizontal plane, the projection comes into a state in which it is restricted in its movement in the vertical direction by the second restrictor. Also, it is possible to remove the projection away from the storage space by rotating the main body back into the original position where it was before the rotation, thereby allowing the projection to pass through the opening. In other words, it is possible to support the main body of the container-securing device detachably/attachably on a cargo bed without using bolts. In addition, since the first restrictor which is around the storage space restricts movement of the projection in all directions within the horizontal plane, it is possible to avoid directionality in bearing a burden and to reduce load bearing burden on each container-securing device.

The main body may be provided with a pin which is protruded by an elastic force from a spring and is retractable against the elastic force from the spring. In this arrangement, the socket is provided with a guide which gradually retracts the pin as the main body rotates to move the pin along an arc, and a stopper which makes engagement with the pin as the pin passes the guide and protrudes, thereby stopping rotation of the main body. According to this arrangement, it is possible to set the main body correctly in the socket and to keep the setting reliably by simply placing the projection into the socket and then simply rotating the main body.

The socket may be formed with a contact portion which makes contact with the protruded pin in case there is an attempt to insert the projection into the opening in an incorrect orientation. The arrangement makes it possible to prevent the projection from being inserted into the opening in the incorrect orientation.

The socket may be provided with an over-turn preventer which restricts the projection from rotating beyond the predetermined range in the storage space. The arrangement makes it possible to stop rotation of the main body at a timing when setting of the main body into the socket is complete as the main body has arrived at an end of its rotation range.

The main body may have a fitting portion for fitting into a groove hole of a corner casting of the container; a movable protrusion provided in the fitting portion for pivoting on a horizontal shaft to protrude in a lateral direction; and a stopper which restricts the pivotal movement of the movable protrusion. According to the arrangement, it is possible to make a locked state to restrict the pivotal movement of the movable protrusion.

Advantageous Effects of Invention

The present invention offers an advantage that the main body of the container-securing device is detachably/attachably supported on a cargo bed without using bolts yet movement of the main body is restricted in any direction within a horizontal plane.

BRIEF DESCRIPTION OF DRAWINGS

FIG. 13A is a schematic plan view of a cargo bed, whereas FIG. 13B is a schematic side view of the cargo bed.

DESCRIPTION OF EMBODIMENTS

Hereinafter, embodiments of the present invention will be described with reference to the attached drawings.

Figure 1:
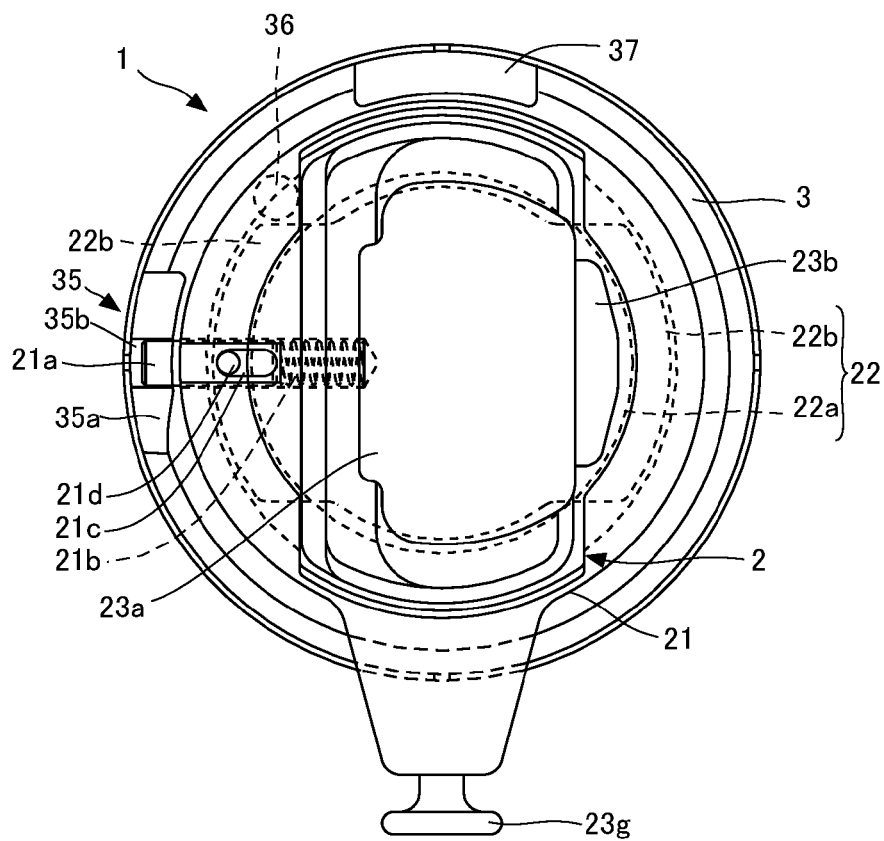
FIG. 1 is a schematic plan view which shows a container-securing device according to an embodiment of the present invention.
Figure 2:
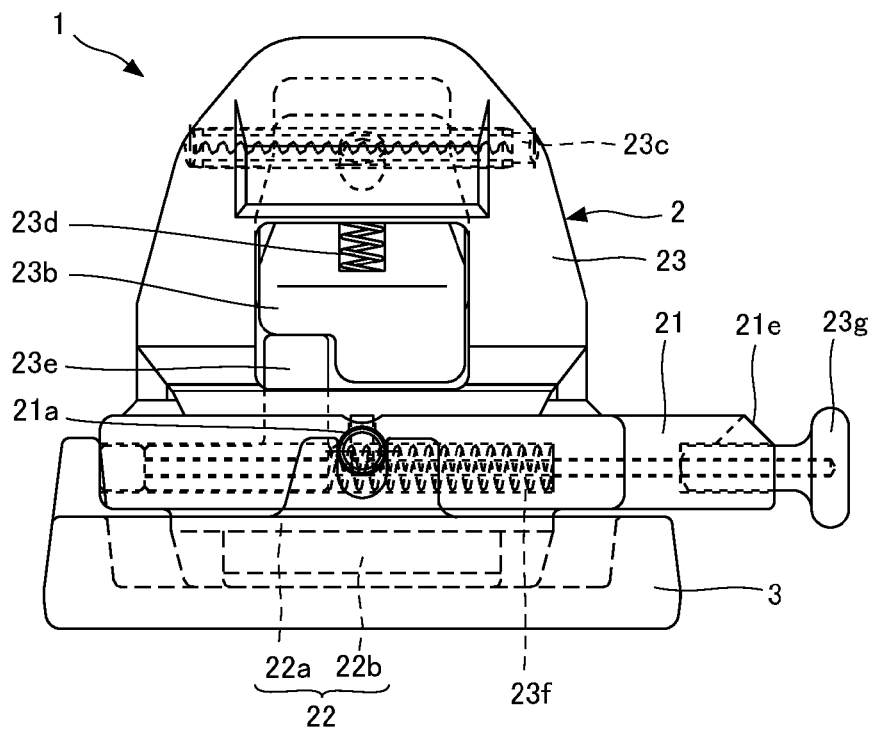
FIG. 2 is a left side view of the container-securing device in FIG. 1.
Figure 3:
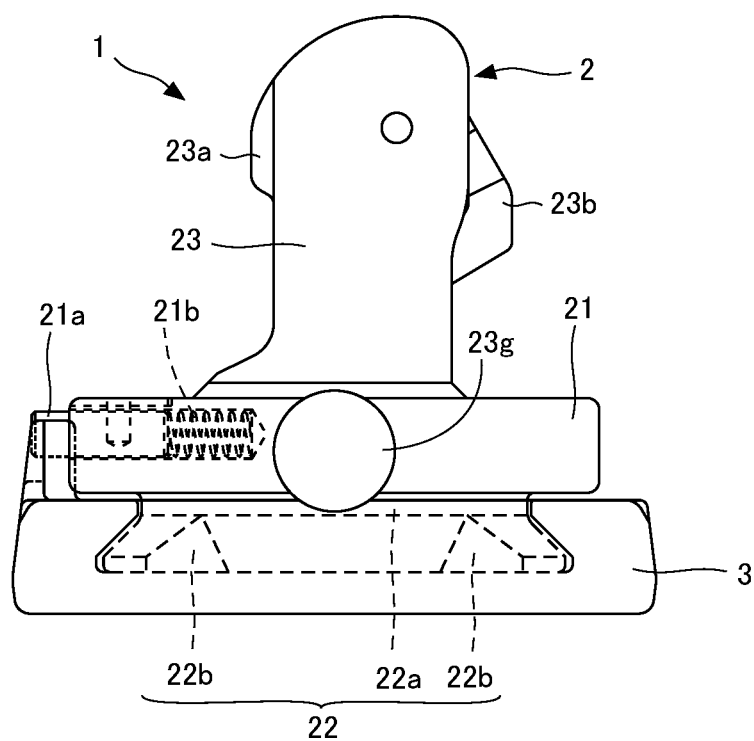
FIG. 3 is a front view of the container-securing device in FIG. 1.
Figure 13:
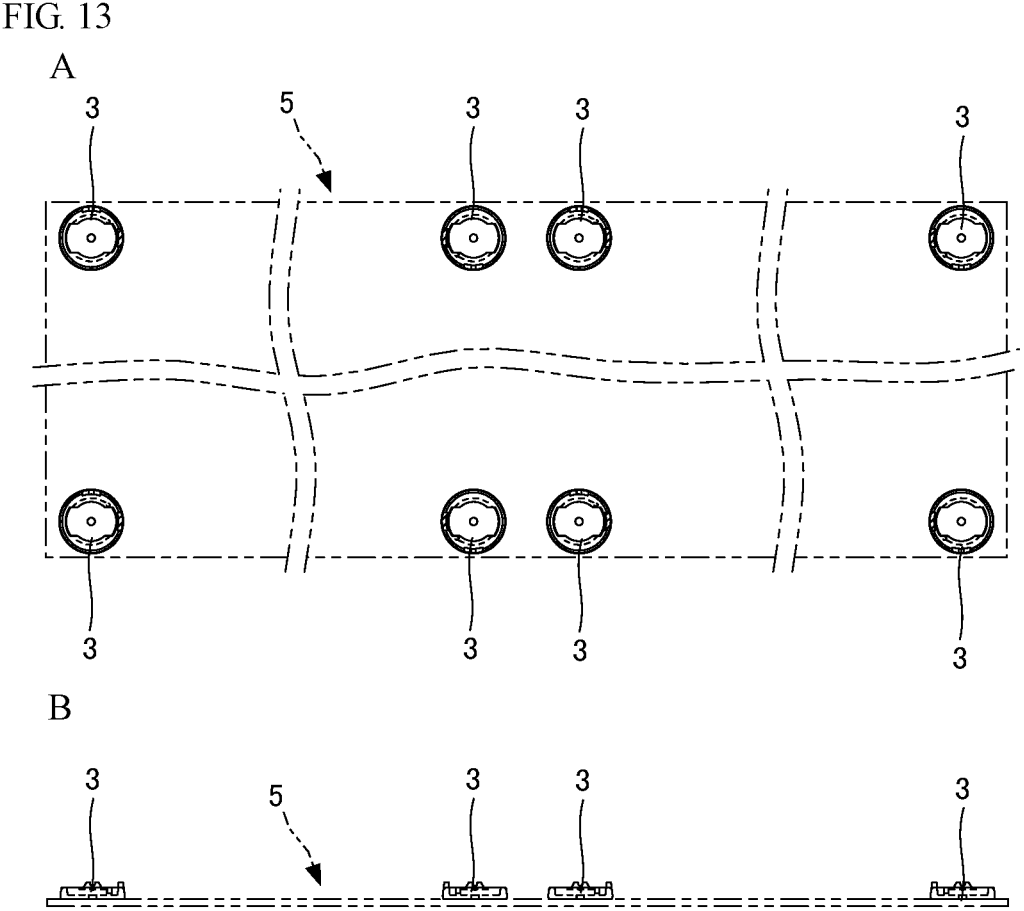
Figure 14:
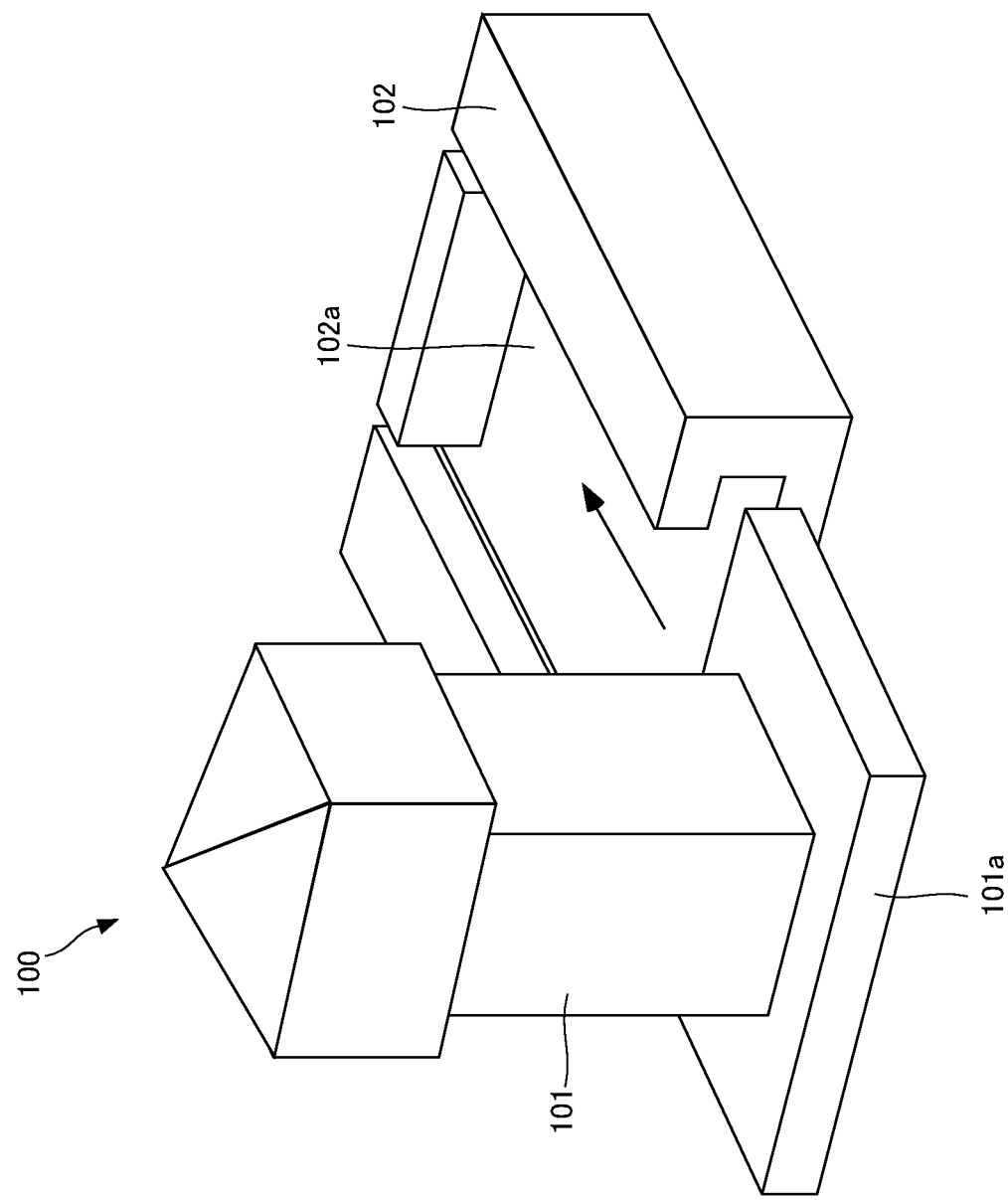
FIG. 14 is a perspective view of a container-securing device for comparison to the container-securing device in FIG. 1.

As shown in FIG. 1, FIG. 2 and FIG. 3, a container-securing device 1 according to the present invention includes a main body 2 and a socket 3. The socket 3 is fixed onto a cargo bed of a transportation vehicle such as a railroad freight, container trailer, etc. For example, as shown in FIG. 13A and FIG. 13B, the socket 3 is fixed at each of the four corners of a 40-foot container cargo bed 5. The socket 3 is also fixed at each of four intermediate locations of the cargo bed 5, for 20-foot containers. When the main body 2 is set to each of the four sockets 3 at the corners of the cargo bed 5, it is possible to fix a 40-foot container onto the cargo bed 5 with these main bodies 2 provided at these four locations. On the other hand, when the main body 2 is set to the socket 3 at each of the eight locations on the cargo bed 5, it is possible to fix two 20-foot containers onto the cargo bed 5 with these eight main bodies 2.

The main body 2 is formed with a cylindrical flange 21. The flange 21 has a lower surface provided with a leg 22 which is concentric with the flange 21. The leg 22 includes a flat cylindrical support pillar 22a which has a smaller diameter than that of the flange 21; and projections 22b each formed on a lower surface side of the support pillar 22a to project horizontally to an outer circumferential side of the support pillar 22a. The projections 22b are not circular. For example, the projections 22b are formed at two locations around a circle, 180° apart from each other on the support pillar 22a. Each projection 22b has an outer circumferential end surface formed as an arc of a circle centered on the circular center of the support pillar 22a. It should be noted here that the present invention is not limited by this arrangement of forming a projection at two locations 180° apart from each other. For example, the projection may be formed at three locations 120° apart from each other, or at four locations 90° apart from each other. The projection 22b has a sloped surface, with its thickness becoming increasingly thinner at a more radially outward location. However, such a sloped surface does not limit the invention, either.

Figure 4:
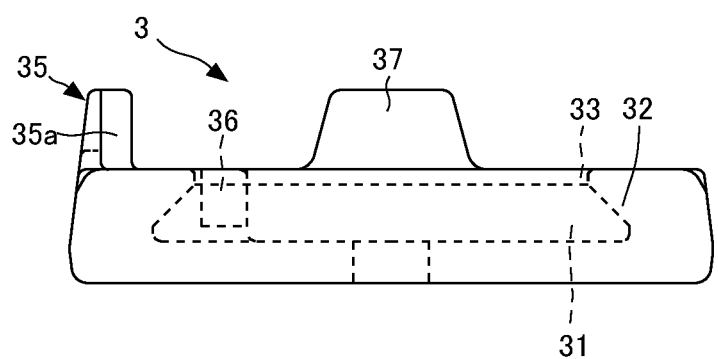
FIG. 4 is a front view of a socket of the container-securing device in FIG. 1.
Figure 5:
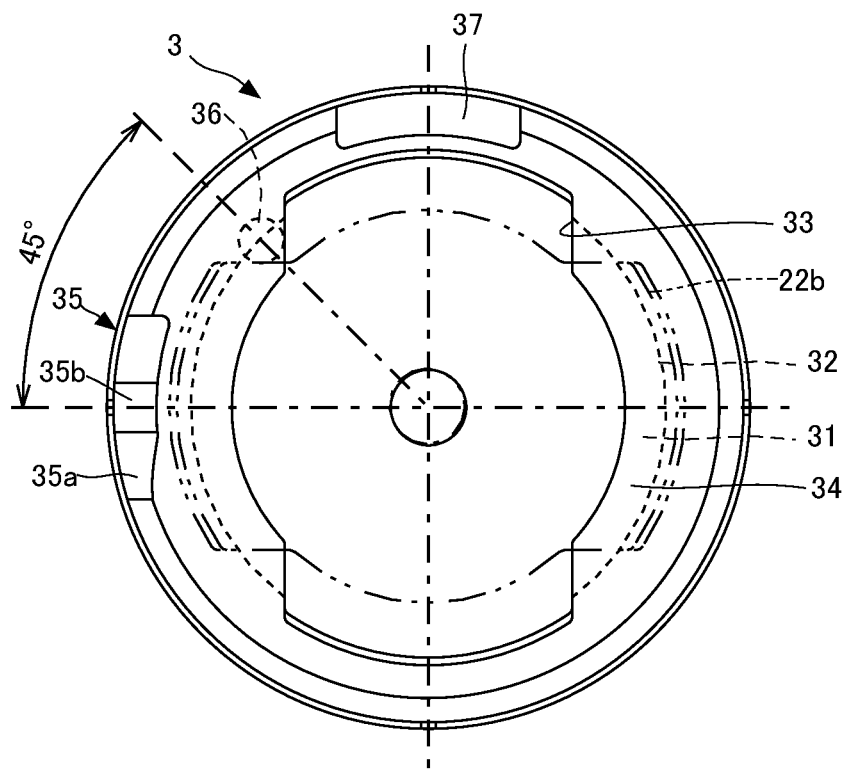
FIG. 5 is a plan view of the socket of the container-securing device in FIG. 1.
Figure 6:
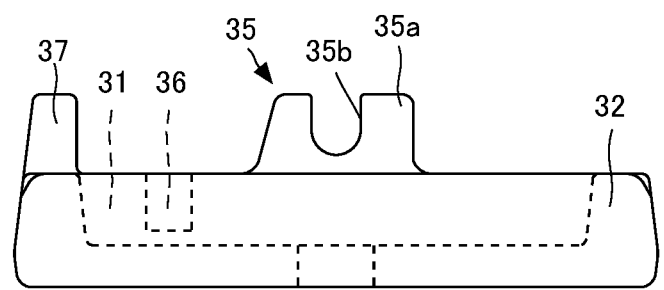
FIG. 6 is a left side view of the socket of the container-securing device in FIG. 1.

As shown also in FIG. 4, FIG. 5 and FIG. 6, the socket 3 is disc-like, formed therein with a circular storage space 31 for storage of the projections 22b. The storage space 31 is a circular hollow having a slightly larger diameter than that of the circle which includes the arc of the outer circumferential end surface of the projections 22b.

Around the storage space 31, there exists a circular, first restrictor 32 which allows rotation of the projections 22b within a horizontal plane but restricts other movement thereof in any direction within the horizontal plane.

The socket 3 is formed with an upward facing opening 33 on a top, center-side thereof. The opening 33 communicates with the storage space 31, and allows the projections 22b to be inserted therethrough.

Also, there is a second restrictor 34 around the opening 33. The second restrictor 34 restricts movement of the projections 22b in the vertical direction. In other words, when the projections 22b are inserted through the opening 33 into the storage space 31, and then the main body 2 is rotated by 90° within the horizontal plane, the second restrictor 34 comes above the projections 22b to restrict the projections 22b from moving in the vertical direction. By being rotated by 90°, the main body 2 becomes engageable with a corner casting of the container on the cargo bed.

The main body 2 is formed with a pin 21a on the flange 21. The pin 21a protrudes in a centrifugal direction out of an outer circumferential surface of the flange 21 under an elastic force from a spring 21b, and also can move toward the center of the flange 21 against the elastic force of the spring 21b. Also, the flange 21 has an upper surface formed with a long hole 21c extending in a diameter direction of the flange 21. The pin 21a is formed with a process 21d on its upper surface. The process 21d is inside the long hole 21c. This allows the pin 21a to move within the long hole 21c in the diameter direction of the flange 21.

On the other hand, the socket 3 is formed with a first standing wall 35 in its outer circumferential side of an upper surface. The first standing wall 35 is formed with a guide 35a which has a sloped surface to gradually press the pin 21a horizontally toward the center of the flange 21 as the main body 2 rotates within the horizontal plane to move the pin 21a along an arc; and a dent-like stopper 35b which stops rotation of the main body 2 by capturing the pin 21a once it has passed the guide 35a and protrudes. As the projections 22b are inserted through the opening 33 into the storage space 31 and then the main body 2 is rotated by 90° within the horizontal plane, the pin 21a makes engagement with the stopper 35b of the first standing wall 35.

As shown in FIG. 5, the socket 3 is formed with an over-turn preventer 36 at a position 45° apart from a center of the stopper 35b in the rotational direction for attaching the main body 2. The over-turn preventer 36 protrudes downward from an upper surface of the socket 3 into the storage space 31. As the over-turn preventer 36 makes contact with the projection 22b, rotation of the projections 22b beyond a predetermined range (90° in the present embodiment) is prevented.

Figure 7:
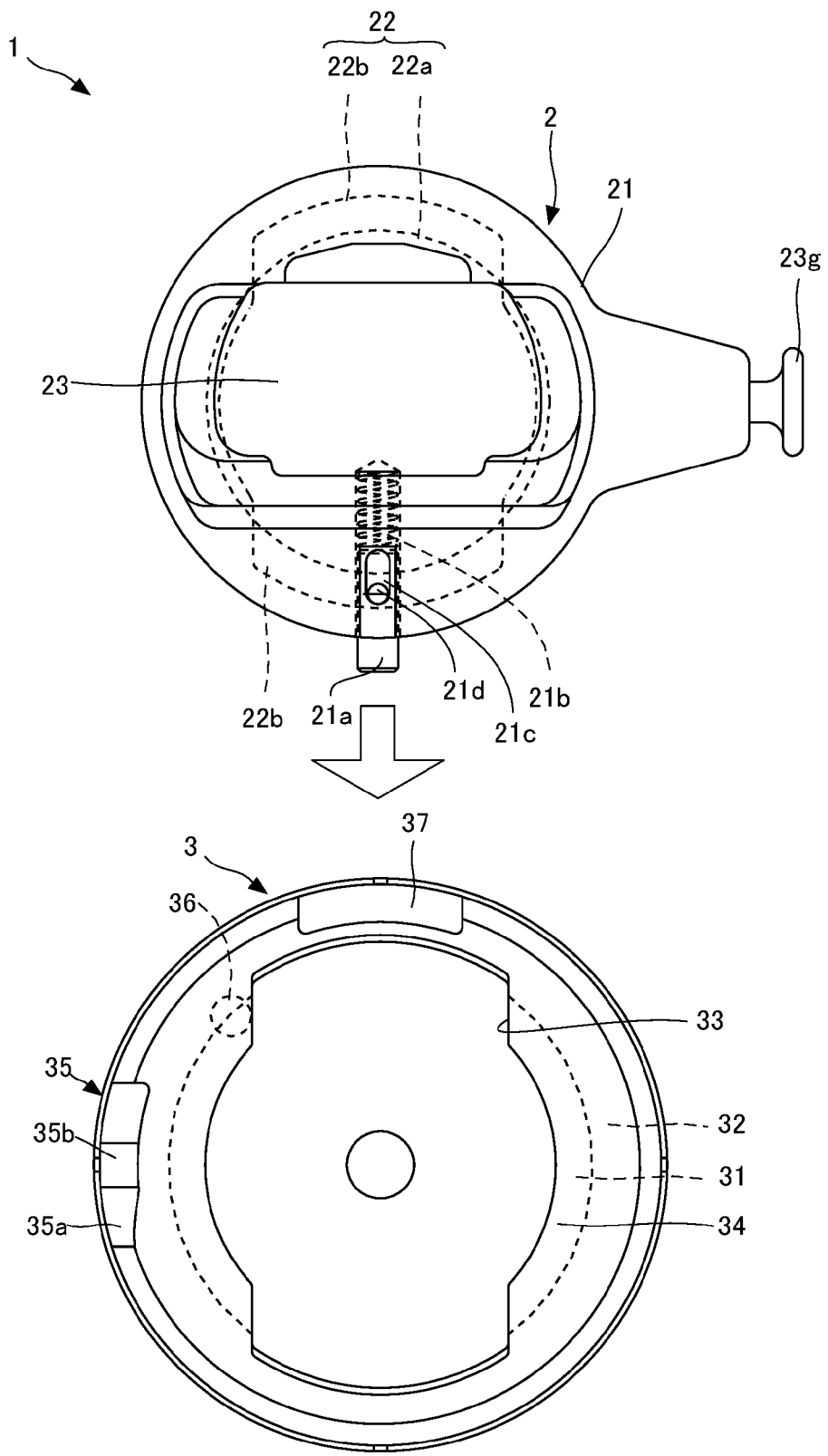
FIG. 7 is an explanatory view which shows a direction in which the main body of the container-securing device in FIG. 1 is attached to the socket.
Figure 8:
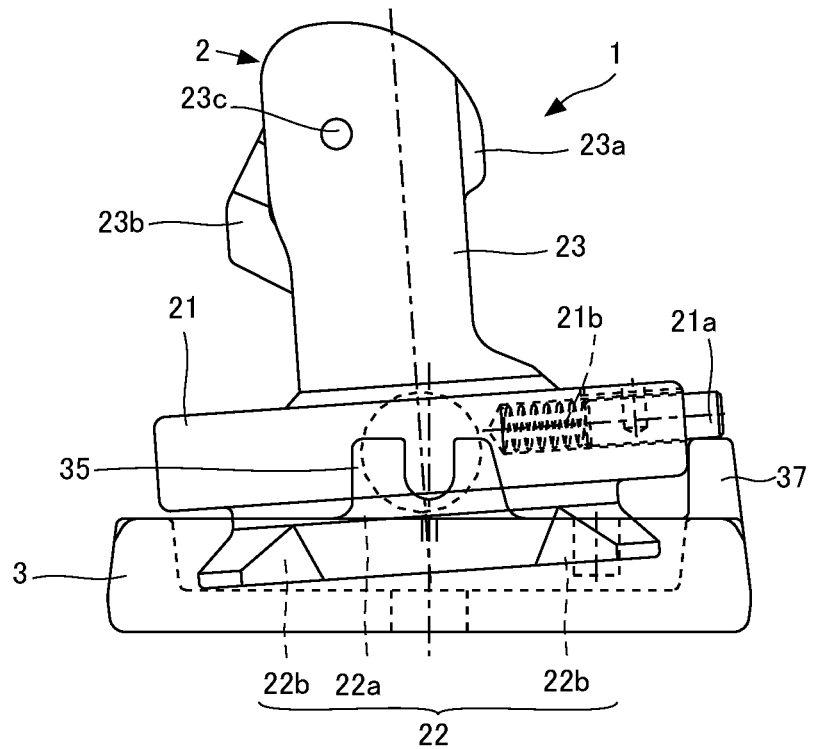
FIG. 8 is an explanatory view which shows a situation where the main body of the container-securing device in FIG. 1 is attached to the socket in an incorrect orientation.

On the outer circumferential side of the upper surface of the socket 3, there is provided a second standing wall (contact portion) 37 at a position 90° apart from the center of the stopper 35b in the rotational direction for attaching the main body 2. Therefore, as shown in FIG. 7, it is possible to insert the projections 22b into the opening 33 when the pin 21a is at a correct position, which is 180° away from the second standing wall 37; but when the components are not in the above-described positional relationship, it is not possible to insert the projections 22b into the storage space 31 from the opening 33. In other words, as shown in FIG. 8, if there is an attempt to insert the projections 22b into the opening 33 in an incorrect orientation, the protruding pin 21a comes in contact with an upper surface of the second standing wall 37 and makes it impossible to place the projections 22b into the storage space 31 from the opening 33.

The socket 3 is fixed to the cargo bed 5 by means of welding for example. The welding is made on the outer circumference of the socket 3. If the outer circumference of the socket 3 is circular, it is easy to perform the welding, and an amount of weldment can be small.

Figure 9:
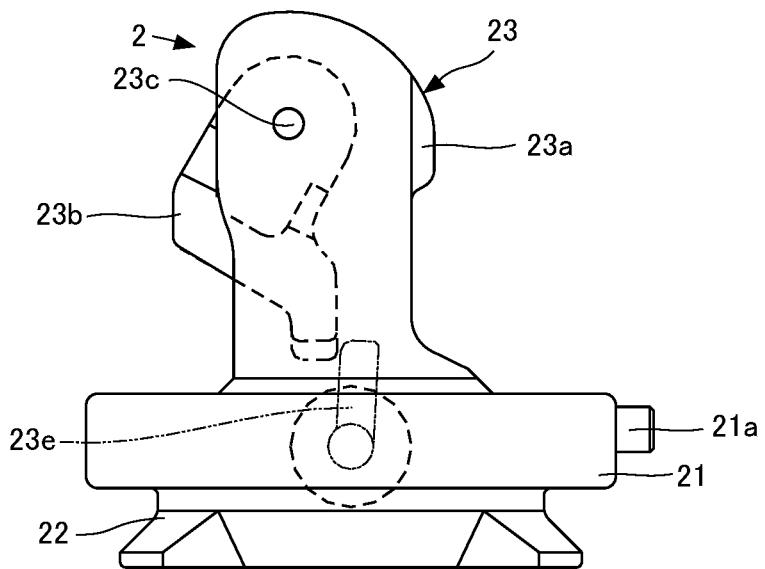
FIG. 9 is a rear view of the main body of the container-securing device in FIG. 1.

It should be noted here that the main body 2 has a cone which serves as a fitting portion for engagement with a groove hole of a corner casting provided on a lower surface of the container. There is no specific structural limitation to the cone. In the present embodiment, as shown in FIG. 9, the main body 2 has a cone 23 on the support pillar which is provided on an upper side of the flange 21. The support pillar is formed with two vertical-surface portions facing away from each other in parallel to long sides of a long hole which leads to the groove hole of the corner casting. The surfaces of the vertical-surface portions are perpendicular to a protruding direction of the two projections 22b in the leg 22.

The cone 23 has a fixed protrusion 23a protruding from the vertical-surface portion which is on the side where the pin 21a is located; and a movable protrusion (latch) 23b protruding from the vertical-surface portion which is on the side away from the side where the pin 21a is. The fixed protrusion 23a has its most protruding region, the movable protrusion 23b has its most protruding region, and these two regions are not at the same height. The fixed protrusion 23a is formed with a slope surface which makes sliding contact with an edge of the groove hole when pulled for unloading the container. The movable protrusion 23b is also formed with a slope surface which makes sliding contact with an edge of the groove hole.

Figure 10:
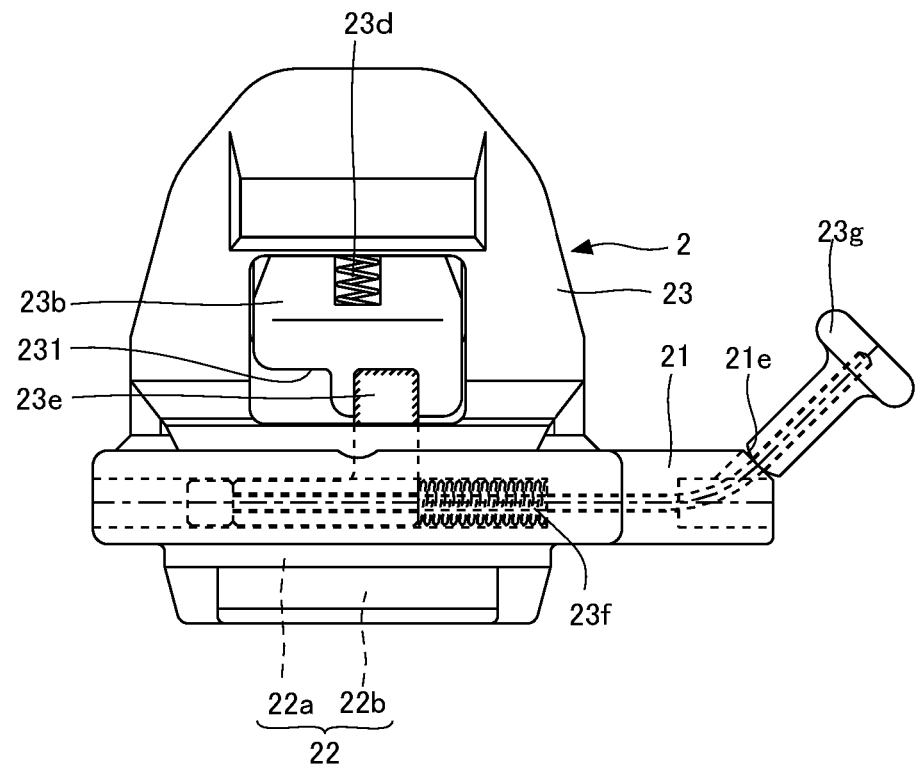
FIG. 10 is an explanatory view which shows a locked state of a movable protrusion in the main body of the container-securing device in FIG. 1.

The movable protrusion 23b is pivotable on a horizontal shaft 23c provided in the support pillar, and is urged by a spring 23d in a direction in which the movable protrusion 23b protrudes. The flange 21 is provided with a stopper 23e which keeps the movable protrusion 23b protruded. As shown also in FIG. 10, the stopper 23e makes contact with a lower region of the movable protrusion 23b, thereby restricting the pivotal movement of the movable protrusion 23b. The stopper 23e is slidable in a direction perpendicular to the protruding direction of the movable protrusion 23b, and is urged by a coil spring 23f to move in an unlocking direction. The stopper 23e is tied to a grip handle 23g with a piece of wire for example. As the grip handle 23g is pulled against the elastic force of the coil spring 23f, it becomes possible to move the stopper 23e to a position where the movable protrusion 23b is restricted in its pivotal movement. The flange 21 is formed with a horizontally protruding extension. On an upper side of its end surface, the extension is formed with a hanger 21e provided by a slope surface. After the grip handle 23g is pulled as described above, the grip handle 23g may be hung on the hanger 21e to keep the movable protrusion 23b restricted in its pivotal movement.

Figure 11:
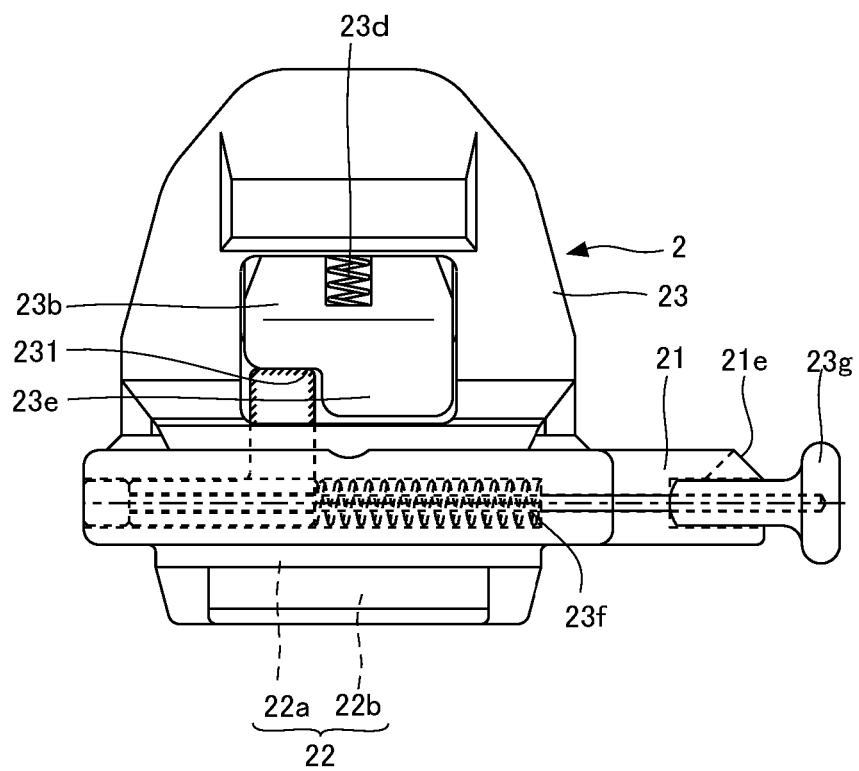
FIG. 11 is an explanatory view which shows an unlocked state of the movable protrusion in the main body of the container-securing device in FIG. 1.
Figure 12:
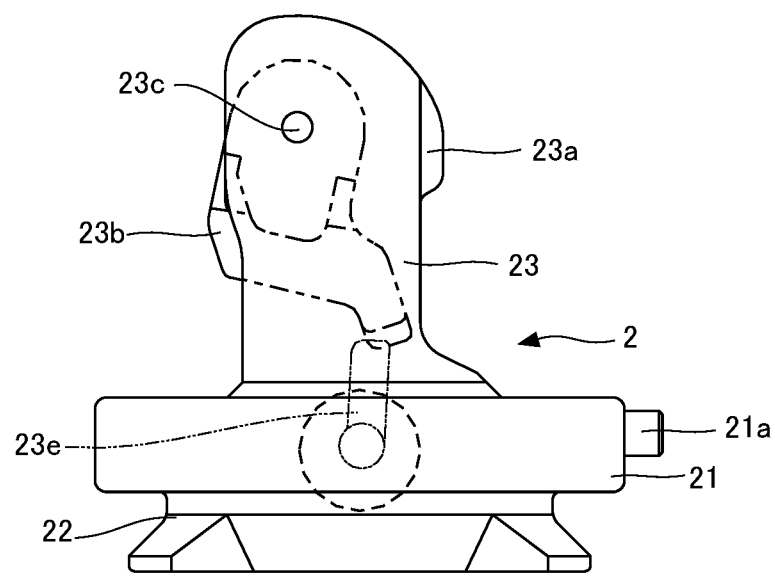
FIG. 12 is an explanatory view which shows the unlocked state of the movable protrusion in the main body of the container-securing device in FIG. 1.

When the grip handle 23g is released from the above-described hanging position, the stopper 23e is slid in the unlocking direction by the elastic force of the coil spring 23f. The movable protrusion 23b has its lower region formed with a cutout 231, which allows the stopper 23e to pass through when slid in the unlocking direction. Therefore, the movable protrusion 23b can pivot without being interfered by the stopper 23e under the unlocked state, and as shown also in FIG. 11 and FIG. 12, can move to the support pillar side. When a container is lowered onto the cargo bed, the cone 23 moves into a groove hole of the corner casting provided in the container's lower surface. In this process, the movable protrusion 23b is pressed by an edge of an entrance opening of the groove hole into the support pillar side, and as the edge of the entrance opening passes over the movable protrusion 23b, the movable protrusion 23b protrudes from the support pillar. The container is fixed by the movable protrusion 23b which is now in the protruded state, and by the fixed protrusion 23a. When the container is lifted and removed from the cone 23, the movable protrusion 23b makes the same movement.

As has been described thus far, the container-securing device 1 includes a socket 3 which is fixed onto a cargo bed; and a main body 2 which is attached into the socket 3 to fix a container. The main body 2 has its lower region formed with projections 22b projecting horizontally. The socket 3 has a storage space 31 to store the projections 22b; a first restrictor 32 around the storage space 31 which allows rotation of the projections 22b within a horizontal plane but restricts other movement in any horizontal direction within the horizontal plane; an opening 33 which communicates with the storage space 31 and allows the projections 22b to be inserted therethrough; and a second restrictor 34 around the opening 33 for restricting movement of the projections 22b in the vertical direction.

According to the above-described arrangement, when the projections 22b are placed inside the storage space 31 through the opening 33 and then rotated within the horizontal plane, the projections 22b are brought into a state in which it is restricted in its movement in the vertical direction by the second restrictor 34. Also, by bringing the main body 2 back into the original position where it was before the rotation, so that the projections 22b can pass through the opening 33, it becomes possible to move the projections 22b out of the storage space 31. In other words, it is possible to support the main body of the container-securing device detachably/attachably on a cargo bed without using bolts. In addition, since the first restrictor 32 around the storage space 31 restricts movement of the projections 22b in all directions within the horizontal plane, it is possible to avoid directionality in bearing a burden and to reduce load bearing burden on the container-securing device 1.

Also, the main body 2 is provided with a pin 21a which is protruded by an elastic force of a spring 21b but is retractable against the elastic force of the spring 21b; and the socket 3 has a first standing wall 35 formed with a guide 35a which gradually retracts the pin 21a as the main body 2 rotates to move the pin 21a along an arc, and a stopper 35b which makes engagement with the pin 21a once the pin has passed the guide 35a and protruded, thereby stopping the rotation of the main body 2. According to the arrangement, it is possible to set the main body 2 into the socket 3 correctly, and to keep the setting reliably by simply placing the projections 22b into the socket 3 and then simply rotating the main body 2.

The socket 3 is formed with a second standing wall (contact portion) 37 which makes contact with the protruded pin 21a if there is an attempt to insert the projections 22b into the opening 33 in an incorrect orientation. The arrangement makes it possible to prevent the projections 22b from being inserted into the opening 33 in the incorrect orientation. Particularly in cases where the projections 22b are formed at two locations in a symmetrical fashion, there is a greater chance for the directional error when the main body 2 is placed into the socket 3; however, providing the second standing wall 37 eliminates such an erroneous attachment.

The socket 3 is provided with an over-turn preventer 36 which restricts the projections 22b from being rotated beyond the predetermined range within the storage space 31. The arrangement makes it possible to stop rotation of the main body 2 at a timing when setting of the main body 2 into the socket 3 is complete as it has arrived at an end of its rotation range.

Thus far, embodiments of the present invention have been described with reference to the drawings. However, the present invention is not limited to these illustrated embodiments. Any of these embodiments illustrated thus far may be modified or changed in many ways within the scope or within the equivalence of the present invention.

REFERENCE SIGNS LIST

1 Container-Securing Device
2 Main Body
21 Flange
21a Pin
21b Spring (Elastic Member)
22 Leg
22b Projection
23 Cone (Fitting portion)
23b Movable protrusion
3 Socket
31 Storage Space
32 First restrictor
33 Opening
34 Second restrictor
35 First Standing Wall
35a Guide
35b Stopper
36 Over-turn preventer
37 Second Standing Wall (Contact Portion)

The invention claimed is:

1. A container-securing device comprising: a socket to be fixed to a cargo bed; and a main body to be attached to the socket for fixing a container; wherein the main body has a lower region formed with a horizontally projected projection, the socket is provided with: a storage space for storing the projection; a first restrictor around the storage space which allows rotation of the projection within a horizontal plane but restricts other movement of the projection in any direction within the horizontal plane; an opening which communicates with the storage space for insertion of the projection; and a second restrictor around the opening which restricts movement of the projection in a vertical direction, the main body is provided with a pin which is protruded by an elastic force from an elastic member and is retractable against the elastic force from the elastic member, and the socket is provided with a guide which gradually retracts the pin as the main body rotates to move the pin along an arc, and a stopper which makes engagement with the pin as the pin passes the guide and protrudes, for stopping rotation of the main body.

2. The container-securing device according to claim 1, wherein the socket is formed with a contact portion which makes contact with the pin in a protruding state if there is an attempt to insert the projection into the opening in an incorrect orientation.

3. The container-securing device according to claim 1, wherein the socket is provided with an over-turn preventer which restricts the projection from rotating beyond a predetermined range in the storage space.

4. The container-securing device according to claim 1, wherein the main body has a fitting portion for fitting into a groove hole of a corner casting of the container; a movable protrusion provided in the fitting portion for pivoting on a horizontal shaft to protrude in a lateral direction; and a stopper which restricts the pivotal movement of the movable protrusion.

5. The container-securing device according to claim 2, wherein the socket is provided with an over-turn preventer which restricts the projection from rotating beyond a predetermined range in the storage space.

6. The container-securing device according to claim 2, wherein the main body has a fitting portion for fitting into a groove hole of a corner casting of the container; a movable protrusion provided in the fitting portion for pivoting on a horizontal shaft to protrude in a lateral direction; and a stopper which restricts the pivotal movement of the movable protrusion.

7. The container-securing device according to claim 3, wherein the main body has a fitting portion for fitting into a groove hole of a corner casting of the container; a movable protrusion provided in the fitting portion for pivoting on a horizontal shaft to protrude in a lateral direction; and a stopper which restricts the pivotal movement of the movable protrusion.

* * * * *